Nov. 19, 1940.  F. SCHMIDT  2,221,884
ELASTIC BEARING
Filed May 24, 1938
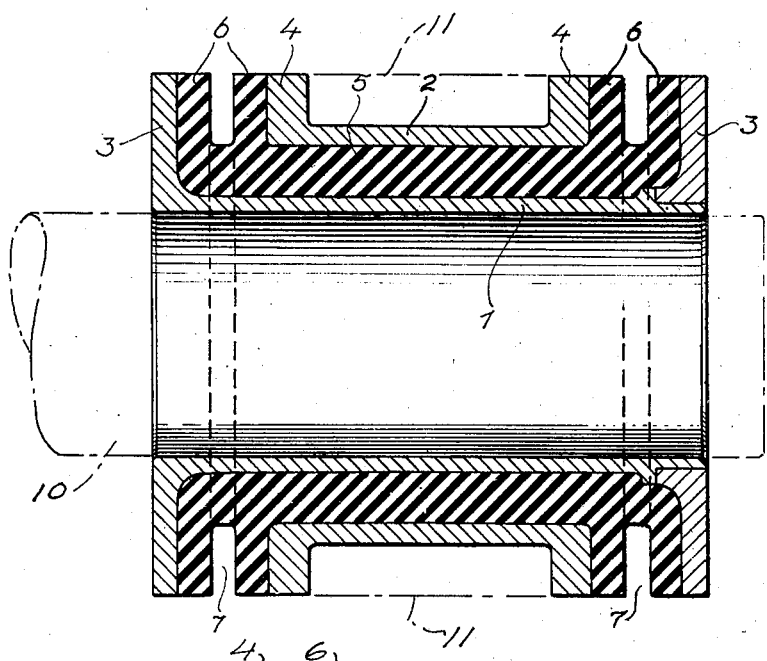
INVENTOR.
Fritz Schmidt.
BY
Harness, Dickey & Pierce
ATTORNEYS.

Patented Nov. 19, 1940

2,221,884

UNITED STATES PATENT OFFICE 2,221,884

ELASTIC BEARING

Fritz Schmidt, Harburg-Wilhelmsburg, Germany

Application May 24, 1938, Serial No. 209,800½
In Germany June 1, 1937

4 Claims. (Cl. 308—26)

The invention relates to a rubber bushing which is tightly vulcanized or cemented between metal parts for the elastic mounting of attachment studs for engines or the like.

The object of the invention is to dampen any high-frequency vibrations originating in the engine during their transmission to the rubber bushings, and thereby to protect the engine support or machine frame from the detrimental action of the vibrations.

It is known how to use rubber bushings for a similar purpose, wherein the bushings are fastened either between smooth cylindrical sleeves, or else between such sleeves with added flanges. The first form does not afford the necessary limitation of stresses where axial forces are concerned, so that these stresses may attain a magnitude that the rubber cannot absorb for long without injury. With the second form this is indeed possible; however, in many cases the damping of the axial vibrations is too hard, because the rubber is hereby stressed in tension or compression, and its elasticity under such stresses is generally considerably less than it is with shear stressing. The essence of the present invention lies in taking this circumstance into account, and an advantage of the invention is that the flexibility of the rubber bushing with respect to axially acting forces is not only kept inside relatively wide limits, but we can also hereby influence the shape of the springing curve.

In the drawing Fig. 1 illustrates one form of construction of the invention by a longitudinal section in the vertical plane of symmetry of the subject of the invention, and Fig. 2 is a similar view showing a different form of the invention.

Between the sleeves 1 and 2, both provided with flanges 3 and 4 respectively, a rubber layer 5 is tightly vulcanized or even cemented in a known way. An attachment stud 10, for the suspension of an aircraft engine for example, may be inserted and fastened in the hole in sleeve 1 in any suitable manner. The sleeve 2 is disposed in this case on aircraft structure 11, which is to be protected by the rubber layer 5 from the vibrations that originate in the engine.

It may be noted that one of the flanges 3 on the inner sleeve is a separate member which is fastened to the sleeve in any suitable way such as by welding or brazing or the end of the sleeve might be turned outwardly so as to overlap the flange sufficiently to hold it in place.

In accordance with the invention, annular slots 7 are disposed in the flange pieces 6 of the rubber 5, which slots of themselves and because of a special form serve to make the rubber more or less flexible during the action of axial forces. If the slot cross-section is rectangular, as shown by Figure 1, then the rubber will have a relatively large flexibility to a certain extent that is related to the width of the slot, whereupon a rapid increase in resistance to the maximum occurs almost directly.

With another form of construction, as shown by Fig. 2, the slot cross section is more of a triangular form, as indicated at 9, with the triangle apex directed inwardly. The increase in resistive action by the rubber is in this case more gradual. It is easy to see that the depth of the slot 7 has an influence relative to the development of the rubber's resistance, which may be utilized in individual cases to effect the general result to be obtained.

What is claimed is:

1. A vibration dampener comprising an inner sleeve adapted to be connected to one member and having end flanges directed outwardly from the sleeve axis, an outer sleeve adapted to be connected to another member and disposed around the inner sleeve but spaced radially therefrom and also having outwardly directed end flanges between the sleeves and axially between the axially of the inner sleeve, and rubber radially between the sleeves and axially between the flanges and bonded thereto, said rubber between the two flanges at each end of the assembly having an annular radially outwardly open recess.

2. A vibration dampener comprising an inner sleeve adapted to be connected to one member and having end flanges directed outwardly from the sleeve axis, an outer sleeve adapted to be connected to another member and disposed around the inner sleeve but spaced radially therefrom and also having outwardly directed end flanges between but axially spaced from the end flanges axially of the inner sleeve, and rubber radially between the sleeves and axially between the flanges and bonded thereto, said rubber between the two flanges at each end of the assembly having an annular radially outwardly open recess substantially channel shape in cross section.

3. A vibration dampener comprising an inner sleeve adapted to be connected to one member and having end flanges directed outwardly from the sleeve axis, an outer sleeve adapted to be connected to another member and disposed around the inner sleeve but spaced radially therefrom and also having outwardly diercted end flanges between but axially spaced from the end flanges axially of the inner sleeve, and rubber radially between the sleeves and axially between the flanges and bonded thereto, said rubber between the two flanges at each end of the assembly having an annular radially outwardly open recess substantially V-shape in cross section.

4. A vibration dampener comprising an inner cylindrical sleeve adapted to receive a stub shaft or the like and having an outwardly directed radial flange at each end, an outer sleeve adapted to be connected to a second member and disposed around the inner sleeve in radially spaced relation thereto and having an outwardly directed radial flange at each end which is axially spaced from the adjacent end flange on the inner sleeve, and a rubber sleeve between the sleeves and having end flanges projecting radially outwardly between the end flanges on the respective ends of the first sleeves, each of said rubber flanges having an annular radially outwardly open groove or slot which extends inwardly substantially to the radially inner edge of the flange on the outer sleeve.

FRITZ SCHMIDT.